Nov. 23, 1965
C. N. MOSOVSKY
3,218,984
FLUID PRESSURE DEVICE
Filed Feb. 10, 1965
6 Sheets-Sheet 1
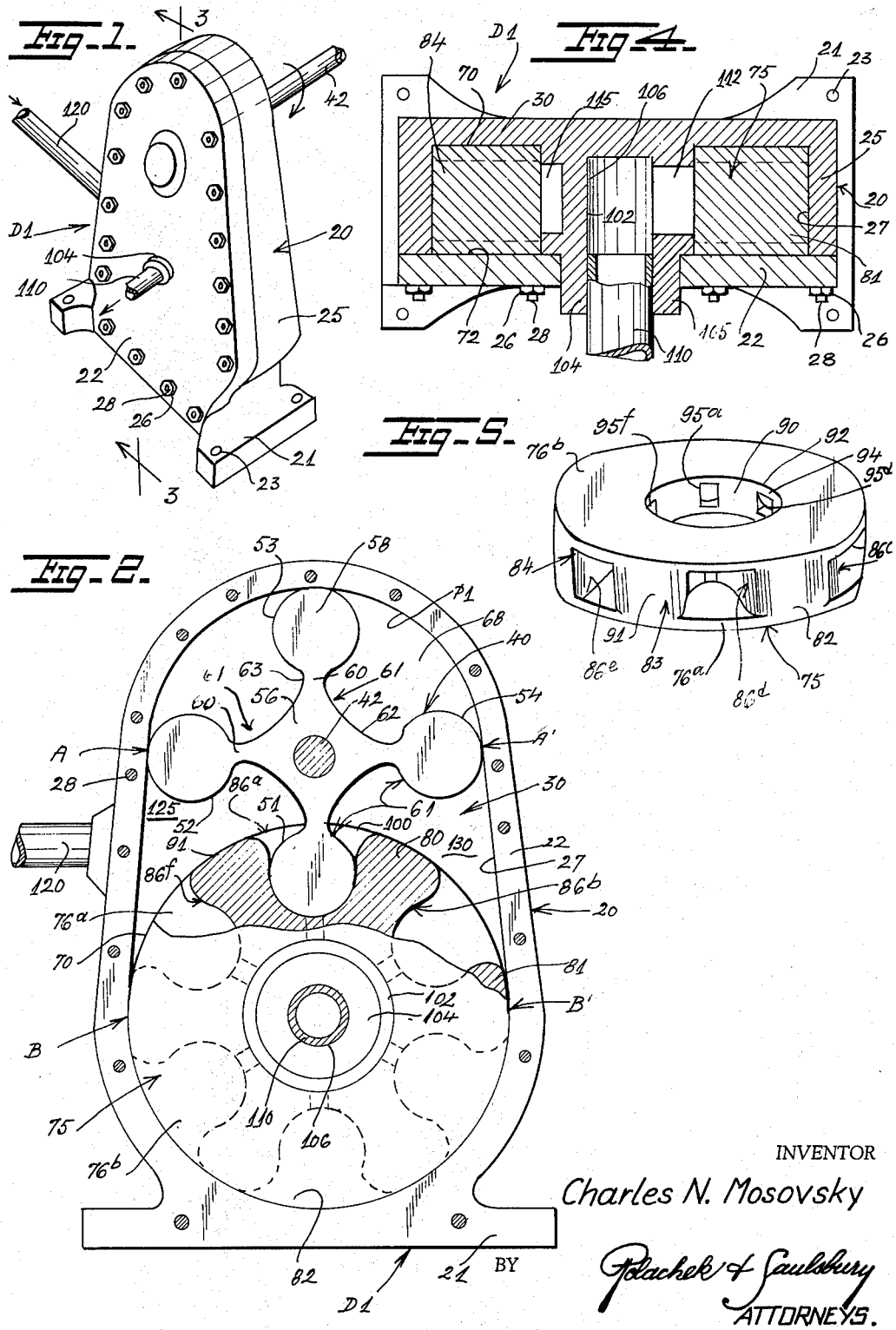
INVENTOR
Charles N. Mosovsky
BY
Polachek & Saulsbury
ATTORNEYS.

Nov. 23, 1965     C. N. MOSOVSKY     3,218,984
FLUID PRESSURE DEVICE

Filed Feb. 10, 1965             6 Sheets-Sheet 2

INVENTOR
Charles N. Mosovsky

BY Polachek & Saulsbury
ATTORNEYS.

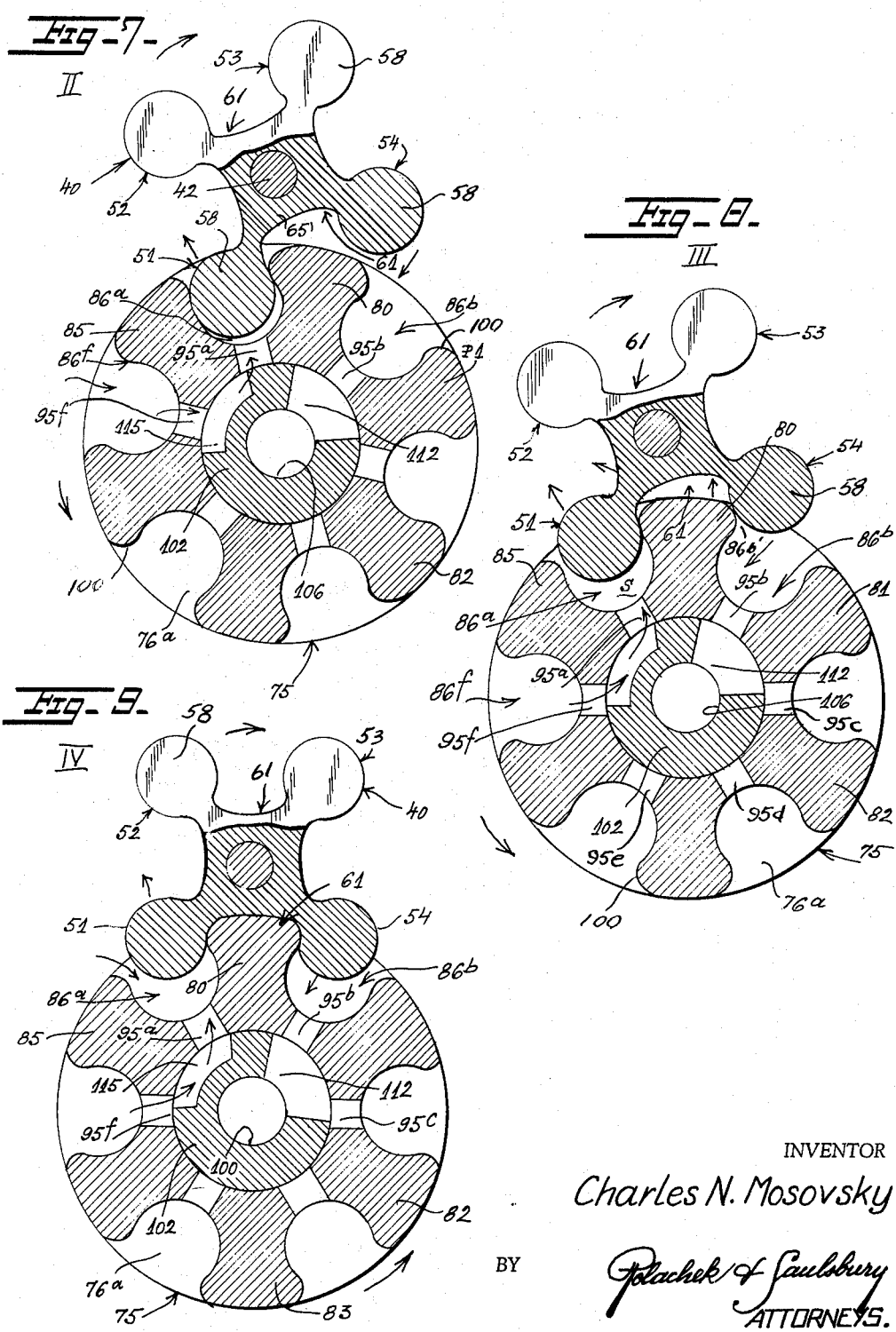

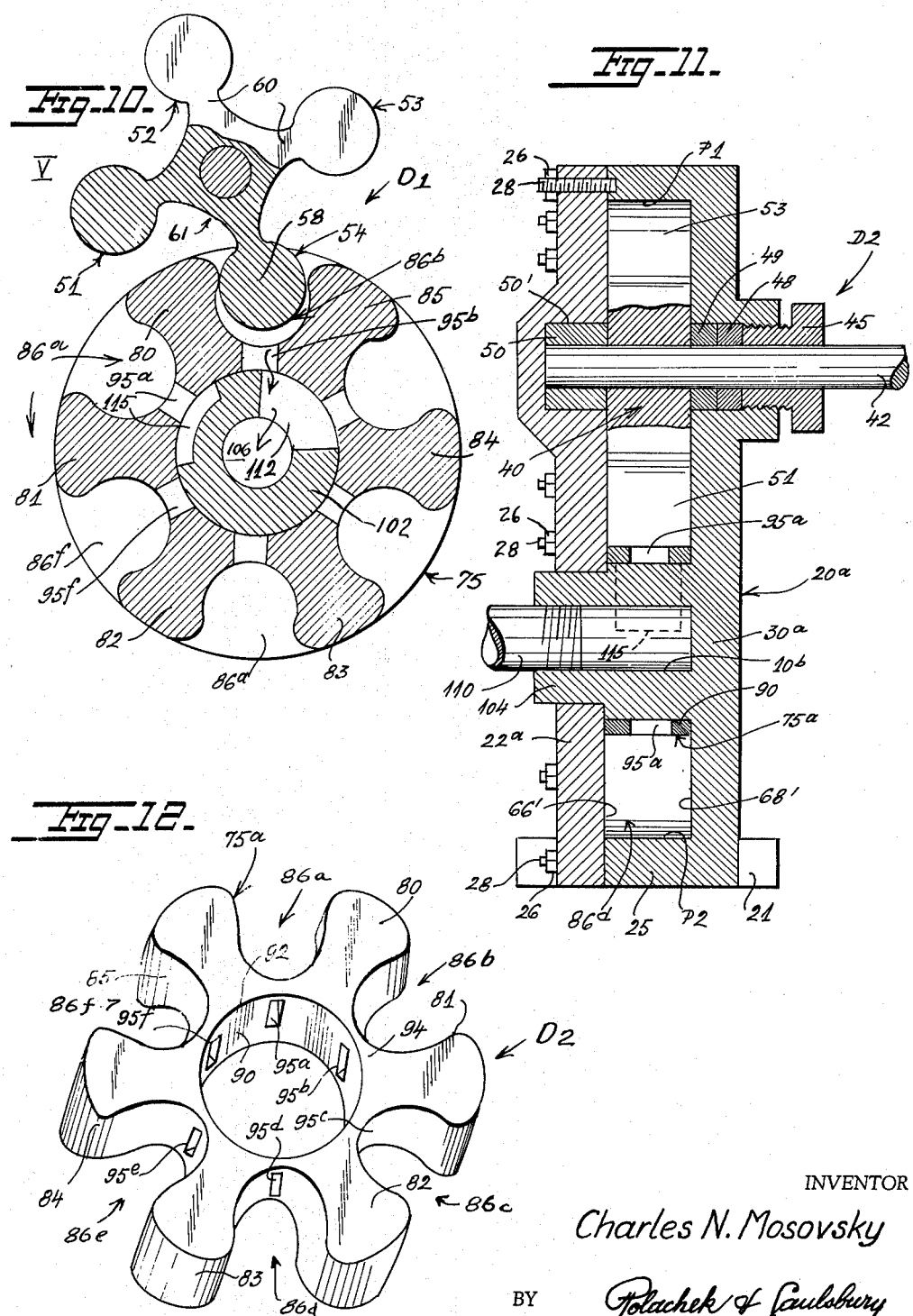

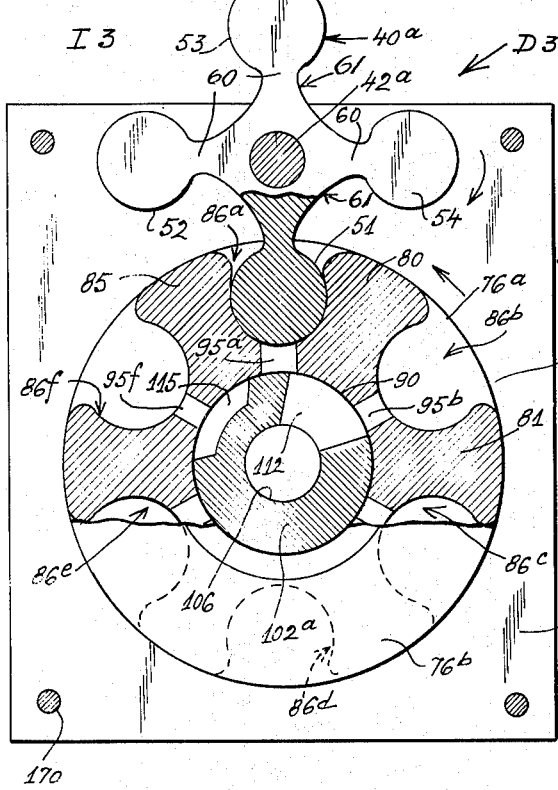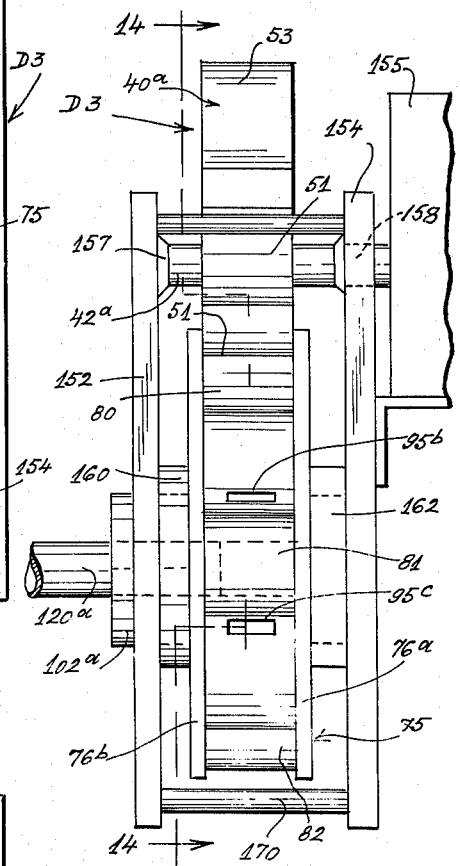
Nov. 23, 1965 C. N. MOSOVSKY 3,218,984
FLUID PRESSURE DEVICE
Filed Feb. 10, 1965 6 Sheets-Sheet 5
INVENTOR
Charles N. Mosovsky

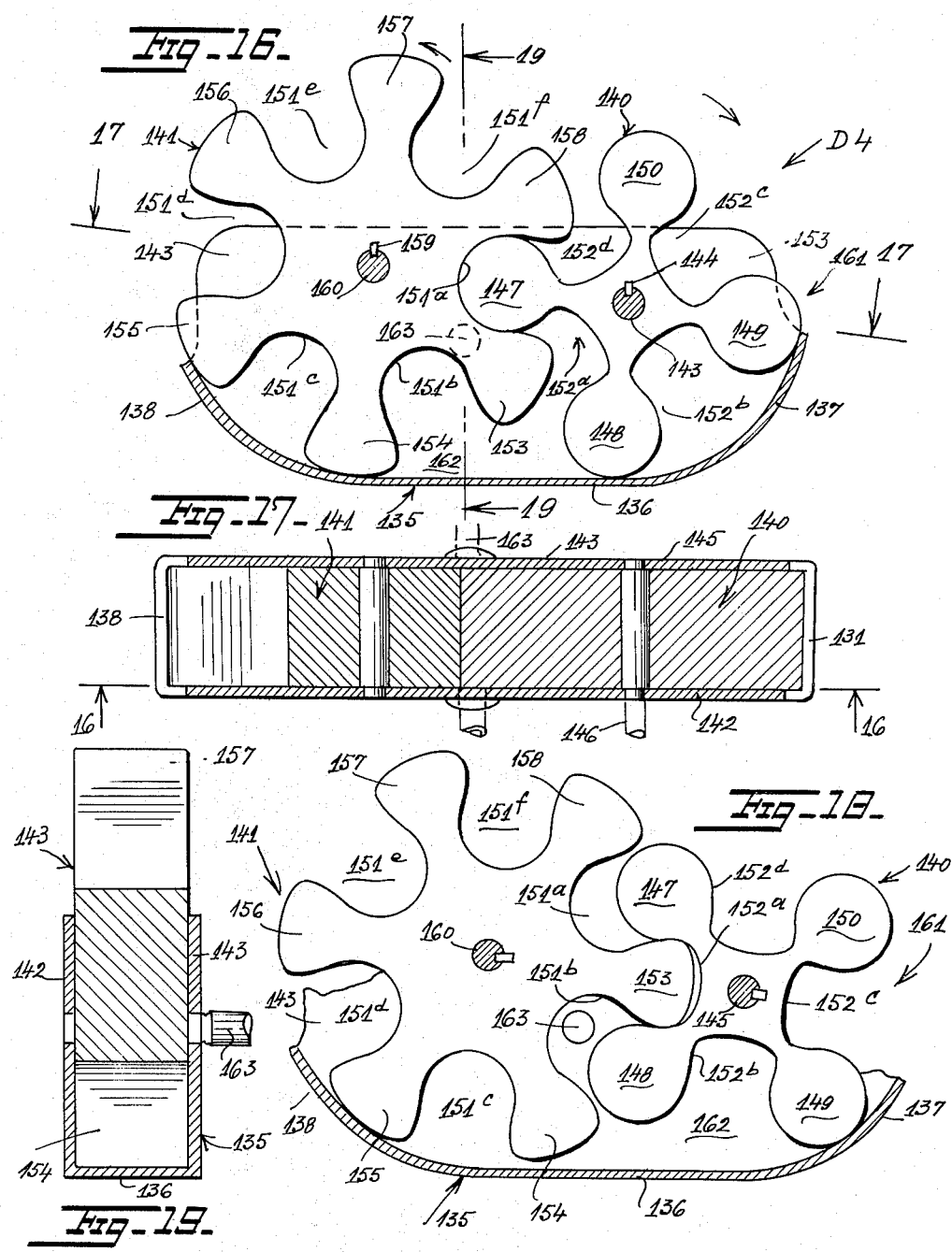

United States Patent Office 3,218,984
Patented Nov. 23, 1965

3,218,984
FLUID PRESSURE DEVICE
Charles N. Mosovsky, 249 E. 2nd St., New York, N.Y.
Filed Feb. 10, 1965, Ser. No. 431,544
8 Claims. (Cl. 103—126)

This application is a continuation in part of my copending application, Serial Number 174,929, filed February 19, 1962, now abandoned.

According to the invention there is provided a fluid impelling device having two rotary members mounted for rotation on spaced parallel axes. The rotors can be enclosed in a housing or casing in sealing relationship with cylindrically curved parts thereof, or they may be mounted on open framework for operation while immersed in a fluid medium. Each of the rotors has a plurality of radially-extending, circumferentially-spaced lobes with recesses between the lobes. The lobes on each rotor intermesh with the lobes of the other rotor in sealing contact with the recesses of rotors therebetween. One of the rotors may have flat annular plates on opposite sides thereof. Each of the rotors has flat, parallel sides. The rotors rotate in the housing or casing in sealing contact with opposite parallel sides of the casing or framework and with the cylindrically curved parts thereof. In the casing are two chambers or compartments. One compartment may serve as an inlet compartment to receive fluid from an external conduit connected to the casing. The other compartment is filled under pressure as the rotors rotate in the casing. One of the rotors may serve as a drive rotor and driven by a powered shaft connected thereto. The other rotor then serves as the driven rotor. This rotor of the enclosed casing has passages or holes at inner ends of its recesses connected wtih an axial bore in a cylindrical boss on which the driven rotor rotates. As the lobes of the drive rotor enter the recesses of the driven rotor, the fluid is pumped through the passages with boss into the bore of a cylindrical boss and out of the discharge conduit connected to the boss. A suction intake or vacuum-relieving duct or passage is provided in the surface of the boss to relieve the vacuum in each recess and draw fluid into the recess as each of the lobes of the driving rotor leaves the recesses of the driven rotor.

The rotors can be driven in opposite direction so that the device serves as a suction pump. According to other forms of the invention, the side plates of the driven rotor are omitted when this rotor is installed in a casing in sealing, sliding contact with its side walls. When the rotors are rotatably mounted in an open framework to expose the rotors to ambient fluid, the driven rotor with integral side plates may be used to define recesses or pockets which can be closed by the lobes of the drive rotor, or according to one final form the side plates of the rotor are omitted.

It is, therefore, one object of the invention to provide a fluid-impelling device including a pair of multiple lobed rotary members or rotors, the lobes being intermeshed with each other in continuous sliding, driving contact so that the rotors rotate in synchronism with each other and the fluid pumped from the intermeshed recesses.

Another oject is to provide a fluid-impelling device having a drive rotor or rotary member and a driven rotor or rotary member, each of the rotors having multiple lobes, the lobes of the drive rotor being cylindrical in form, the driven rotor having recesses with cylindrically curved bottom portions to identically receive the lobes of the drive rotor in close fitting relationship so that the lobes of the drive rotor force fluid out of holes formed in inner ends of the recesses or draw fluid into the recesses according to the direction of rotation of the rotors.

Still another object is to provide a fluid-impelling device as last described, wherein the driven rotor rotates on a stationary boss of the casing having a bore and duct communicating with the holes in the driven rotor and further having a suction intake and vacuum relieving duct on the surface of the boss adapted to connect two adjacent recesses in the driven rotor.

A further object is to provide a fluid-impelling device as described, wherein the drive rotor has recesses between its lobes which the lobes of the driven rotor enter by in sliding, side-wise rolling contact and continuous driving engagement of the rotors to give full time for the fluid to be forced from the space during the entry thereof and so that there is no need for the drive rotor to have pressure relieving ducts to prevent locking of the rotors.

A still further object is to provide a fluid-impelling device as described, wherein the rotors are enclosed in a casing having opposing side and end walls with the rotors respectively disposed in sliding, sealing contact with the side and end walls of the casing and without need of side plates for the driven rotor.

A still further object is to provide a fluid impelling device having multiple lobed rotors mounted in open framework so that the rotors are exposed to a fluid medium in which the device may be immersed, but the framework being closed between the intermeshing lobes to provide the pumping chamber from which the fluid is forced by pump action.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view on a reduced scale of a fluid-impelling device embodying the features of the invention according to form D1 thereof.

FIG. 2 is an enlarged side elevational view of the device, with one side wall partially removed to show the interior thereof.

FIG. 4 is a cross-sectional view of the device taken on line 4—4 of FIG. 3.

FIG. 5 is a perspective view of the driven rotor removed from the casing.

FIGS. 7–10 are sectional views similar to portions of FIG. 6 showing the rotary members in different relative positions II to V during an operation pumping cycle.

FIG. 11 is a vertical sectional view similar to FIG. 3 of another fluid-impelling device to form D2 of the invention without side plates on the driven rotor.

FIG. 12 is a perspective view of a driven rotary member used in the device of FIG. 11.

FIG. 13 is a side elevational view of still another fluid-impelling device of the immersion type and according to form D3 thereof employing side plates on the driven rotor but with open framework.

FIG. 14 is a vertical sectional view taken on line 14—14 of FIG. 13, showing rotary members intermeshed in one operating position I3.

FIG. 15 is a fragmentary sectional view similar to part of FIG. 14, showing rotary members intermeshed in a different operating position IV3.

FIG. 16 is a side elevational view of a further fluid-impelling device D4 having open framework and particularly adapted to pump compressible fluid such as air one side thereof being cut away to expose the full front surfaces of the rotors and as viewed generally on line 16—16 of FIG. 17.

FIG. 17 is a horizontal sectional view of the device taken on line 17—17 of FIG. 16.

FIG. 18 is a fragmentary elevational view of the device similar to FIG. 16 but with the rotors advanced to another position.

FIG. 19 is a vertical sectional view taken on line 19—19 of FIG. 16.

Figure 3:
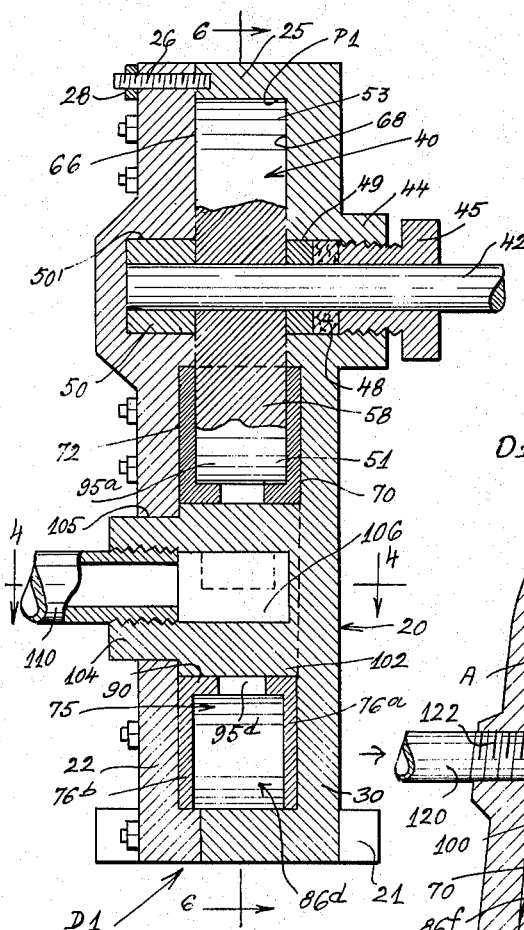
FIG. 3 is an enlarged vertical sectional view of device taken on line 3—3 of FIG. 1.

Referring first to FIGS. 1–6, there is shown a fluid-impelling device D1 having a hollow housing or casing 20 with an open side closed by a side wall 22. The housing 20 is generally tapered in form. At its wider lower end are flanges 21. Holes 23 in the flanges receive bolts for mounting the device on a support. The device will operate in any position but is shown for convenience in the drawings disposed in a vertical position. The side wall 22 is a plate held on the rim of peripheral wall 25 of the casing by nuts 26 engaged with bolts or studs 28. The casing has a flat wall 30 integral with peripheral wall 25 closing the other side of the casing.

Figure 6A:
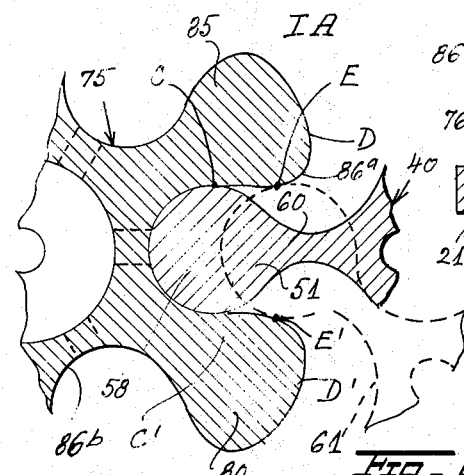
FIG. 6A is a fragmentary vertical sectional view of the intermeshed rotors taken over a portion of the same line 6—6 of FIG. 3 but enlarged to show more clearly the exact shapes of the lobes and alternate spaces of the rotors.
Figure 6:
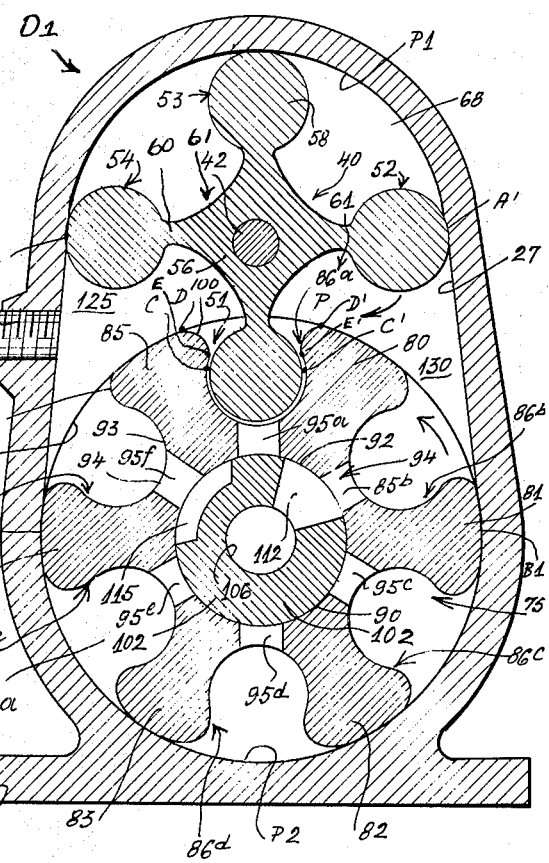
FIG. 6 is a vertical sectional view device taken on line 6—6 of FIG. 3 with rotors at position I.

The inner side 27 of wall 25 is formed as a semi-cylinder in part P1 between points A and A' at one end of the casing; see FIGS. 2, 6. At the other end of the casing the inner side 27 of wall 25 defines another semi-cylinder in part P2 between points B and B'. A rotary member or rotor 40 is centrally mounted on a shaft 42 which extends axially perpendicular to wall 30 and passes through an internally threaded boss 44 formed in wall 30; see FIG. 3. A bearing nut 45 is screwed into boss 44 and supports the shaft. A packing gland 48 is disposed between washer 49 and the inner end of the nut and prevents leakage of fluid out of the casing past the shaft. The inner end of the shaft rotates in a bearing 50 and held in a recess 50' formed in the side wall 22.

The rotor 40 has four spokes 51–54 extending radially outward of a flat generally rectangular center disk or plate 56. Each of the spokes terminates in a cylindrical lobe 58. The lobes are integrally connected to corners of plate 56 by tapered, rigid necks 60. Between each pair of adjacent spokes is defined a recess 61 having a curved inner side wall defined by an outer side or edge 62 of plate 56. The radius of curvature of edge 62 is substantially that of the convex peripheral edge of the lobe 58. The sides 63 of the necks have curvatures which provide a smooth transition between the cylindrical curvature of the lobes and the concave curvatures of sides 62 of plate 56.

Rotor 40 may be turned by shaft 42 which will be driven by a suitable motor or driver (not shown) when the device D is used as a pump. If the device is used as a hydraulic motor or power plant, then shaft 42 will be turned when rotor 40 is turned. The thickness of rotor 40 is substantially equal to the width of wall 25 of the distance between the inner side 66 of side wall 22 and the inner side of wall 30. Rotor 40 rotates in the casing with outer ends of lobes 58 in sealing relationship with the semi-cylindrical part P1 of the inner side 27 of wall 25, and with the flat sides of rotor 40 in sealing relationship with the inner sides 66, 68 of walls 22 and 30.

A shallow circular well 70 is formed in the inner side of wall 30 at the wider end of the casing. Aligned axially with well 70 is another circular well 72 of equal diameter formed in the inner side of wall 22. Rotatably engaged in these wells is rotor 75; see FIGS. 2–6. This rotor has two flat annular plates or disks 76a, 76b disposed in the wells 70, 72 respectively. Integrally secured to or formed with the plates 76a, 76b is a plurality of radially disposed circumferentially spaced lobes 80–85. Defined between these lobes are recesses 86a–86f. The lobes extend radially outward of a central ring 90 having a central opening 92. Webs 94 of the ring join base ends of the lobes at the inner ends of recesses 86–89. Holes or passages 95a–95f are centered in the webs 94 providing communication between recesses 86a–86f and the inside of ring 90. Lateral edges of the ring are integral with plates 76a, 76b. The rotor thus forms a unitary structure as best shown in FIG. 5.

The outer ends 91 of lobes 80–85 register in curvature with the peripheries of plates 76a, 76b. Ends 91 of the lobes rotate in sealing relationship with part P2 of the inner side face 27 of wall 25 between points B, B'. The outer sides and peripheries of plates 76a, 76b rotate in sealing relationship with peripheries and sides of wells 70, 72.

The sides 93 of the lobes 80–85 of the rotor 75 and web surface 94 define semi-cylindrical surfaces between points C–C'. The radius of curvature of each of these semi-cylindrical surfaces is substantially the same radius of curvature as each of the lobes 58 so that each lobe enters and turns in recesses 86a–86f in sealing relationship. Outer corners 100 of lobes 80–85 are convex and cylindrically curved between points D, E and D', E', there being straight wall surface between points E, C and E', C' to effect positive piston displacement, as more clearly shown in the enlarged view of FIG. 3A.

Integral with wall 30 of the casing is a cylindrical boss 102 which extends through the ring 90 in the sealing relationship. The rotor 75 turns freely on stationary boss 102. The boss has an end portion 104 of reduced diameter extending through a bore 105 in wall 22. The boss has a central bore 106, with blind inner end; the outer end of the bore may be threaded for securely engaging a conduit 110. The boss has a lateral cut-out or passage 112 near its end at wall 30. This passage extends arcuately about 30° around the boss and communicates with the central bore 106. An arcuate recess or duct 115 is formed in the outer side of the boss 102. This duct also extends arcuately about 75°. Adjacent ends of the passage 112 and recess 115 are spaced apart about 30°, so that opposite ends of passage 112 and recess 115 are spaced apart about 135° at the periphery of boss 102.

The casing is provided with a conduit 120 connected to a threaded bore 122 in wall 25 opening into the casing. Inside the casing are defined two compartments 125, 130 located on opposite sides laterally of the two mutually engaged rotors 40, 75.

The device as described and shown in FIGS. 1–6 may be used as a suction pump or a fluid pressure pump when drive rotor 40 is driven by shaft 42 coupled to an external driving motor. Alternatively the device can be used as a hydraulic fluid generator or power source in which rotor 40 would be driven by fluid flowing through the device.

The operation of the device D1 will now be described in connection with FIGS. 6 through 10 which show several successive stages I–V of an operating cycle of the device. It will be assumed that the device is being operated as a pump to drive fluid entering compartment 125 from conduit 120 serving as an inlet port, through the device and out of conduit 110 serving as a discharge port.

FIG. 6 shows stage I which may be regarded as the end of one cycle and the beginning of another cycle. Drive rotor 40 is being turned clockwise by shaft 42 and driven rotor 75 is being driven counterclockwise by rotor 40. The lobe of spoke 51 is shown fully inserted in recess 86a. Compartment 130 is assumed to contain fluid under pressure, this fluid may be a gas such as air or a liquid such as water, oil, etc., which has been carried around from compartment 125 by the lobes of spokes 51, 54.

FIG. 7 shows stage II during which the lobe 58 of spoke 51 is leaving recess 86a. At this point hole 95a communicates with duct 115 which in turn communicates with hole 95f. A suction effect results so that fluid is drawn into recess 86a from recess 86f and compartment 125 as indicated by arrows in these recesses.

It will be noted that the periphery of spoke 51 remains in constant driving relationship with the left side of recess 86a as viewed in FIG. 7 until spoke 54 starts to drive the driven rotor 75 as shown in state III of FIG. 8. The suction intake into recess 86a continues until opposite sides of the lobe of spoke 51 lose contact with the sides of recess 86a a shown in state III.

In state III, spoke 54 engages lobe 80 and starts to drive the rotor 75. At the same time the lobe of spoke 54 is entering recess 86b. It will be noted that lobe 80 is entering the recess 61 between spokes 51 and 54 and is contracting space S with fluid being relieved continuously at 86b' until full mesh of the recess 61 is had by the lobe 80, the lobes and recesses of the rotors being so shaped and designed to effect totally and displace the recess with the lobe without entrapping any liquid that might tend to lock the rotors.

In state IV of FIG. 9, the lobe 80 has entered the recess 61 between spokes 51, 54 to a maximum extent in full displacement. Lobe 51 has left recess 86a which is now open to compartment 125 so that fluid can enter recess 86a directly from this compartment as well as through duct 115 and hole 95f. The lobe of spoke 54 has now entered recess 86b to a further extent from that of state III.

At state V of FIG. 10, the lobe of spoke 54 has entered and sealed off the mouth of recess 86b forcing fluid through hole 95b and passage 112 into bore 106 and out of conduit 110. Hole 95f has passed beyond duct 115 so there is no suction intake at this stage of operation. Recess 61 between spokes 51 and 54 of rotor 40 will have opened and created suction effect to fill this recess 61 to be carried around clockwise from intake chamber 125 to pressure chamber 130. Likewise the recess 86a of rotor 75 will have received fluid to carry the fluid from the intake chamber 125 counterclockwise to the pressure chamber 130. The next stage of operation is that similar to state I of FIG. 6 where the lobe of spoke 54 will be fully inserted in recess 86b in the position occupied by the spoke 51 in FIG. 6.

The two rotors 40 and 75 rotate in complete synchronization. By this is meant that the periphery of the drive rotor 40 is in continuous sliding contact and driving relation with the periphery of the lobes and recesses of driven rotor 75. For each revolution of drive rotor 40, the driven rotor 75 completes two-thirds of a revolution, since there are six recesses 86a–86f and only four spokes 51–54. It is of course possible to design rotor 40 with a larger number of pokes such as six, so that there will be a unity ratio of speed of rotor 40 to rotor 75. The less spokes of rotor 40 provide greater angular displacement between spokes so more close together the rotor axis can be put whereby to give the pump greater total volume displacement due to the greater intermeshing of the rotor parts.

To operate as a suction pump, conduit 110 may be connected to a fluid gas or liquid supply. The rotors 40, 75 will be driven in reverse directions with rotor 40 rotating counterclockwise and rotor 75 rotating clockwise to pass the fluid into compartment 125 from which it will be expelled through conduit 120. Duct 115 then acts as a pressure relieving circulating duct as lobe 58 of each spoke leaves one of recesses 86a–86f.

FIG. 11 shows another fluid impelling device D2 which is similar to that of device D1 and corresponding parts are identically numbered. Rotor 75a is shown in both FIGS. 11 and 12. Side plates 76a, 76b of rotor 75 of the device D1 are omitted from rotor 75a. Also the wells 70, 72 of casing 20 are omitted from the side walls 22a, 30a of casing 20a.

The thickness of rotor 75a equals the width of wall 26 of the distance between inner sides 66', 68' of walls 22a, 30a. A sealing sliding relationship exists between the flat, parallel opposing sides of rotor 75a and the adjacent sides 66' and 68' of walls 22a, 30a. The device D2 operates in casing 20a in the same manner as described for device D1.

FIGS. 13–15 show another fluid-impelling device D3 which includes operating components similar to those of devices D1 and D2 and corresponding parts are identically numbered. The rotors 40a and 75 are mounted in a frame including two parallel, spaced frame plates 152, 154 and are not enclosed in a housing or casing as in devices D1 and D2. Shaft 42a may be driven by a motor 155 supported on plate 154. Rotor 40a is secured axially to the shaft 42a which is journalled in bearings 157, 158 on plates 152, 154. Boss 102a is integral with plate 154 and extends through hole 92 in ring 90 of rotor 75. Two spacer rings 160, 162 surround the boss 102a and are located between rotor 75 and plates 152, 154, respectively. The plates 152, 154 are secured in spaced, fixed relationship by cross bars 170.

The device D3 can operate in air as a suction pump or as a pressure pump. It will also operate if immersed in a liquid. It will be noted that fluid will enter exhaust conduit 120a under pressure from bore 106 when each lobe of spokes 51–54 is entering a recess 86a–86f in a manner similar to that described in connection with stage V of FIG. 10. The stages I–V of FIGS. 6–10 are all applicable to operation of the device D3. Fluid will enter each recess passing to the position of recess 86a of FIG. 14, from the surrounding fluid gas or liquid medium, and will be pumped out of the recess as the lobes of the spokes 51–54 enter the recesses 86a–86f in turn. FIG. 15 shows stage IV' which is similar to state IV of FIG. 9 in which an intake suction operation is just being completed as the lobe of spoke 51 leaves recess 86a and hole 95f is about to become closed off from duct 115. As space S in each recess 61 contracts fluid passes out of the recess axially of rotor 75. Device D3 will in general not be as powerful as devices D1 and D2 since the cooperating effects of lobes acting in compartments 125 and 130 is not had in device D3. The device D3 will operate as a vacuum pump if conduit 120a is connected to a fluid supply which is to be exhausted. Suction will be exerted in conduit 120a. To accomplish this the rotors or rotary members will be driven in opposite direction, with rotor 40a turning counterclockwise and rotor 75 turning clockwise as viewed in FIG. 14.

FIGS. 16–19 show a further fluid-impelling device D4 which includes an open framework or casing 135 generally of channel shape having a bottom side 136 rounded upwardly at opposite end 137 and 138, respectively having radii of curvature equal to the respective driving and driven intermeshing pump rotors 140 and 141 with their peripheries in fluid tight but sliding engagement therewith, and opposing side walls 142 and 143 with the side faces of the rotors 140 and 141 having fluid tight but sliding engagement therewith. The drive rotor 140 is keyed at 144 to a drive shaft 145 that is journaled in the side walls 142 and 143 and has an extension 146 that can be connected to a rotary power source to rotate rotor 140. The rotor 140 is shaped to have cylindrical lobes 147, 148, 149 and 150 that have piston tight mesh with especially shaped piston chambers 151a to 151f of the drive rotor 141, in the same as above described in connection with the other devices. Alternate spaces 152a to 152d of the drive rotor 140 receive lobes 153, 154, 155, 156, 157 and 158 of the driven rotor 143. The driven rotor 141 is keyed at 159 to a shaft 160 that has its reduced ends journaled in the side walls 142 and 143 and its rotation will be counterclockwise while the drive rotor is being driven clockwise. Above the rotor shafts 145 and 150 the framework or casing 135 is open to the immersed or surrounding space.

As the device D4 is operated, compressible fluid such as air enters the device at 161 and is taken by the alternate spaces 152a to 152d to a compounding chamber 162 located between the rotors 140 and 141 when the fluid is picked up by the piston chambers 151a to 151f and forced by the pistons 147 to 150 in sequence through a discharge outlet 163 in the side wall 143 of the casing 135 adjacent to the bottoms of the piston chamber 151a to 151f as they rotate past the outlet 163. As viewed in FIG. 16, the piston chamber 151a will have passed the outlet 163 and the piston will have gone home therein. As viewed in FIG. 18, the piston 147 will have left the chamber 151a and the piston 148 is entering chamber 151b compressing and forcing fluid through outlet 163 while the chamber 151b is passing thereover and until lobe 154 of the driven rotor 143 will overlie the outlet 163. This procedure continues to have sustained pumping action.

The device D4 may be operated when immersed in some compressible liquid by providing an inlet opening in the casing 135 leading to the compounding chamber 162 to receive liquid directly from the surrounding source thereof.

It should be apparent from the description of all of these fluid-impelling devices that their construction consists generally of three elements, as casing, either open or closed, and intermeshing drive and driven elements, the fluid being pumped by the tight but slide fitting pistons of the drive rotor working corresponding piston chamber of the driven rotor.

While I have illustrated and described the preferred embodiment of my invention, it is to be understood that I do not limit myself to the precise constructions herein disclosed and that various changes and modifications may be made within the scope of the invention as defined in appended claims.

What is claimed is:

1. A fluid-impelling device comprising two rotors, one of said rotors including a flat central hub with a plurality of spokes extending radially therefrom and circumferentially spaced around the hub to define a set of recesses therebetween, each of said spokes having a cylindrical lobe at its outer free end integrally-joined to said hub by a tapered neck having concave opposite sides forming said set of recesses, the other of said rotors having a central ring and a plurality of other lobes extending radially outwardly from said ring and circumferentially spaced to define other recesses therebetween, said ring and other lobes having cylindrically-curved wall portions so that inner end portions of said other recesses receive the cylindrical lobes of the spokes in sealing contact, said other lobes having straight parallel wall portions extending from said curved wall portions and convex corners connecting the straight portions, and outer ends of said other lobes, a closed casing having parallel opposing side walls and a peripheral wall connecting said side walls and slidably receiving the rotor lobes in working engagement therewith, a cylindrical boss integral with one of said walls and extending axially perpendicular to said walls and therebetween and having a central bore in the boss opening at one end of the boss outside the casing, said boss having a lateral passage communicating with said bore, said other rotor being rotatably disposed in the casing and upon said boss, means for rotatably supporting the one rotor in the casing axially parallel to the other rotor, opposite sides of the rotors and ends of the lobes of both rotors rotating in sealing and sliding contact with the side walls and peripheral wall of the casing, with the lobes of the one rotor intermeshed with the lobes of the other rotor so that the peripheries of the lobes of the one rotor are in continuous driving contact with the other lobes of the other rotor and so that rotating the one rotor causes the other rotor to rotate, said central ring having openings therein located at centers of inner ends of the other recesses, said openings communicating with said bore through said passage in the boss, said casing having an intake port to pass fluid therethrough, said boss having a duct communicating with two adjacent recesses of the other rotor to pass fluid for relieving suction when lobes of the one rotor are withdrawn from said other recesses, whereby fluid entering said casing through said intake port is forced into each of the other recesses in turn by the lobes of the one rotor and driven through said openings and said central bore out of the casing.

2. A fluid-impelling device comprising two rotors, one of said rotors including a flat central hub with a plurality of spokes extending radially therefrom and circumferentially-spaced around the hub to define first recesses therebetween, each of said spokes having a cylindrical lobe at its outer free end integrally joined to said hub by a tapered neck having concave opposite sides forming said first set of recesses, a pair of axially parallel annular plates, a central ring integral with and connecting the annular plates, and a plurality of other lobes extending radially outward of said ring between and integral with said annular plates, said other lobes being circumferentially-spaced to define other recesses therebetween, said ring and other lobes having cylindrically-curved wall portions so that inner end portions of said other recesses receive the lobes of the spokes in sealing and rolling contact, said other lobes having straight parallel wall portions extending from said curved wall portions and convex corners connecting said straight parallel portions and outer ends of said other lobes; a closed casing having parallel opposing side walls and a peripheral wall connecting said side walls; a cylindrical boss integral with one of said walls and extending axially perpendicular to said walls and therebetween and having a central bore in the boss opening at one end of the boss outside the casing, said boss having a lateral passage communicating with said bore, said other rotor being rotatably disposed in the casing and upon said boss; means for rotatably supporting the one rotor in the casing axially parallel to the other rotor, opposite sides of the rotors and ends of the lobes of both rotors rotating in sealing and rolling contact with the side walls and peripheral wall of the casing, with the lobes of the one rotor intermeshed with the lobes of the other rotor so that the peripheries of the lobes of the one rotor are in continuous driving contact with the other lobes of the other rotor and so that rotating the one rotor causes the other rotor to rotate, said central ring having openings therein located at centers of inner ends of the other recesses, said openings communicating with said bore through said passage in the boss, said casing having a port to pass fluid therethrough, said boss having a duct communicating with two adjacent recesses of the other rotor to pass fluid for relieving suction when lobes of the one rotor are withdrawn from said other recesses, whereby fluid entering said casing through said port is forced into each of the other recesses in turn by the lobes of the one rotor and driven through said openings and said central bore out of the casing.

3. A fluid-impelling device according to claim 2, wherein the opposing side walls of said casing are formed with circular wells opening into the casing, said annular plates of central ring being rotatably fitted into said wells respectively.

4. A fluid-impelling device according to claim 3, wherein the widths of the lobes of both rotors are equal axially of said rotors, so that opposing sides of the lobes of the one rotor enter said other recesses in sliding, sealing contact with opposing inner sides of said annular plates and with corners of adjacent other lobes of the other rotor.

5. A fluid-impelling device comprising two rotors, one of said rotors including a flat central hub with a plurality of spokes extending radially therefrom and circumferentially-spaced around the plate to define first set of recesses therebetween, each of said spokes having a cylindrical lobe at its outer free end integrally joined to said hub by a tapered neck having concave opposite sides forming said first set of recesses, a pair of axially parallel annular plates, a central ring integral with and connecting the annular plates, and a plurality of other lobes extending radially outward of said ring between and integral with said annular plates, said other lobes being circumferentially spaced to define other recesses therebetween, said ring and other lobes having cylindrically curved wall portions so that inner end portions of said other recesses receive the lobes of the spokes in sealing and rolling contact, said other lobes having straight parallel wall portions extending from said curved wall portions and convex corners connecting said straight parallel portions and outer ends of said other lobes, a frame including a pair of parallel supports, a stationary cylindrical boss carried by one of said supports and extending axially to the other support, said boss having a central bore opening at one end of the boss outside of said other support, said boss having a lateral passage communicating with said bore, said other rotor being rotatably disposed between said supports with said ring engaged on said boss, means for rotatably supporting the one rotor between said supports axially parallel to the other rotor, with the lobes of the one rotor intermeshed with the lobes of the other rotor so that peripheries of the lobes of the one rotor are in continuous driving and rolling contact with the other lobes of the other rotor and so that rotating the one rotor causes the other rotor to rotate, said ring having openings therein located at centers of inner ends of the other recesses, said openings communicating with said bore through said passage in said boss, said boss having a duct communicating with two adjacent recesses of the other rotor to pass fluid for relieving suction when lobes of the one rotor are withdrawn from said other recesses, whereby fluid entering each of the other recesses is forced by each of the lobes of the one rotor in turn through said openings and said passage to and through said central bore after each of the lobes of the one rotor enters into sealing and rolling contact with opposite sides of the other recesses.

6. A fluid-impelling device according to claim 5, wherein the widths of the lobes of both rotors are equal axially of said rotors, so that opposing sides of the lobes of the one rotor enter said other recesses in sliding, sealing contact with opposing inner sides of said annular plates and with corners of adjacent other lobes of the other rotor.

7. A fluid-impelling device comprising a casing element having opposing side walls and an interconnecting wall portion, driving and driven rotor elements intermeshed with one another to be driven and journalled for rotation between the side walls of the casing element, said driving rotor having a hub portion and a plurality of spokes extending radially outwardly therefrom and defining recesses therebetween, each of said spokes having a cylindrical lobe at its outer free end and a neck portion integrally joining the lobe to the hub portion, the interconnecting wall portion of casing element having a curvature being sealingly engaged by the outer periphery of said lobes as the side walls of the casing element are being similarly engaged by the sides of the rotor element, said driven rotor element having a plurality of lobes adapted to extend into the recesses of the driving rotor element and circumferentially spaced to define pump chambers for sealingly and slidably receiving the lobes of the driving rotor element, said pump chambers having cylindrically curved wall surfaces shaped to receive the free ends of the driving rotor lobes, each of the driven rotor lobes having straight parallel wall surfaces extending from the pump chamber curved wall surfaces and convex corners connecting the straight parallel wall surfaces with the outer ends of said driven rotor lobes, whereby the lobes of the driving rotor are received for piston-like engagement with the wall surfaces of the pump chambers of the driven rotor element as the elements are rotated, said interconnecting wall portion of the casing element having a further curvature sealingly and slidingly engaged by the outer ends of the driven rotor lobes as the side walls of the casing element are being similarly engaged by the sides of the driven rotor element, passageway means in one of said elements for admitting fluid to the pump chambers of the driven element, and further passageway means in one of the elements for exhausting the pump chambers upon being worked by the driving rotor lobes.

8. A fluid-impelling device as defined in claim 7, and said casing having its wall portion open except for the curvatures thereof to provide the passageway means for admitting the fluid to the pump chamber of the driven element and an outlet in one of the side walls of the casing element adapted to be traversed by a pump chamber as it is worked by a driving rotor lobe.

References Cited by the Examiner
UNITED STATES PATENTS

| | | | |
|---|---|---|---|
| 1,418,741 | 6/1922 | Stallman | 103—126 |
| 1,456,694 | 5/1923 | Ingraham | 103—126 |
| 1,862,440 | 6/1932 | Tacchi | 103—126 |
| 1,902,346 | 3/1933 | Vogt | 103—126 |
| 1,909,418 | 5/1933 | Norwood | 103—126 |
| 1,912,738 | 6/1933 | Svenson | 103—126 |
| 2,471,915 | 5/1949 | Thacher | 103—126 |
| 2,487,721 | 11/1949 | Minshall | 103—126 |
| 2,505,809 | 5/1950 | Svenson | 103—126 |
| 2,665,639 | 1/1954 | Svenson | 103—126 |

FOREIGN PATENTS

| | | |
|---|---|---|
| 679,397 | 8/1939 | Germany. |
| 525,371 | 5/1955 | Italy. |

DONLEY J. STOCKING, *Primary Examiner.*